United States Patent Office 3,483,046
Patented Dec. 9, 1969

3,483,046
STABILIZED NON-BUBBLING DISPERSION STRENGTHENED LEAD
Michael V. Rose, Sewickley, Robert S. Bowman, Pittsburgh, and James H. Kanzelmeyer, Aliquippa, Pa., assignors to St. Joseph Lead Company, New York, N.Y., a corporation of New York
No Drawing. Filed Mar. 28, 1966, Ser. No. 537,695
Int. Cl. C23c 13/02
U.S. Cl. 148—6.3                    10 Claims

ABSTRACT OF THE DISCLOSURE

Lead particles for the production of dispersion strengthened lead products capable of being hot worked without substantial gas evolution are made by adding a solid substance to lead particles not exceeding about 150 microns in size and subjecting the lead particles during or after the addition of the solid substance thereto to the action of an acid forming oxide of sulfur or an acid derivative thereof. The added substance may be lead oxide added by subjecting the lead particles to an oxygen-containing atmosphere or may be other solid substances insoluble in lead such as alumina, magnesia or lime, or metals or metal alloys such as copper, cobalt, nickel and iron-cobalt alloys or carbon.

---

This invention relates to stabilized non-bubbling dispersion strengthened lead and to methods of making it.

It is known that the physical properties of lead may be enhanced markedly by dispersing with the lead insoluble particles of solid substances such as an oxide or oxides of lead or other oxides, such as alumina, magnesia, lime, metals or metallic alloys such as copper, cobalt, nickel and iron-cobalt alloys, and carbon. A practical range for such additions is in the amount of from about 0.5% to 16% by weight. In general, the added substances are coated on or admixed with lead particles not more than about 150 microns and preferably not over 20 microns in average particle size. A body of the lead particles containing such admixtures or coatings is then subjected to plastic deformation, for example, by rolling or extrusion to comminute the solid substance and to disperse the comminuted substance in the lead matrix.

Of particular interest are the lead products obtained by dispersing within the lead insoluble particles of an oxide or oxides of lead. This may be accomplished by subjecting finely divided lead to conditions under which a coating of oxide is formed on the surface of the lead particles as by atomizing molten lead in an oxidizing atmosphere, such as air, or by subjecting lead particles to the action of an oxidizing gas under controlled conditions, for example, by stirring the lead particles in air in the presence of controlled amounts of moisture in a pan mixer, a double cone mixer or the like. A body of thus treated lead particles is then subjected to plastic deformation, for example, by rolling or extrusion to comminute the lead oxide coating thereon and to disperse the comminuted lead oxide in the lead matrix.

In general, the oxide-coated lead particles should not exceed about 150 microns in size and preferably should not exceed an average particle size of about 20 microns and the surface coating of lead oxide should be in the range of from about 0.5% to about 16% by weight calculated as PbO.

In the known methods of manufacturing dispersion strengthened lead, there inevitably occurs a greater or less take-up of carbon dioxide and water vapor which in turn leads to the presence of various amounts and forms of carbonate and hydrated compounds on the surface of the lead particles. When the resulting specimens of dispersion strengthened lead are heated above some critical temperature, there is observed to occur a bubbling or disturbing action which, it has been discovered, is caused by release of internally generated and entrapped gases. These gases arise from expansion of entrapped air and decomposition of lead compounds other than lead oxide under the influence of heat. Whatever the actual cause for the gas generation may be, the practical fact is that this phenomenon causes difficulty in hot working, for example rolling, forging and extrusion where heat is generated during processing or where the material is preheated prior to being subjected to the working process, and more importantly, it imposes drastic restrictions on the joinability of dispersion strengthened lead parts by conventional welding techniques. Heating of the areas to be joined induces the bubbling phenomenon and leads to an incomplete closure of the joint. Such an imperfect joint may suffer corrosion in certain uses, for example, where a dispersion strengthened lead sheet is used as a plate in a storage battery with a sulfuric acid anolyte.

It has been found that this evolution of gas during hot working of strengthened lead can be substantially eliminated by heating the lead particles, preferably under vacuum to a temperature of from about 280° C. to just below the melting point of the lead particles. In this heating operation the heated particles are substantially completely freed of hydroxyl (OH), carbonate ($CO_3$), or other groups capable of evolving water or carbon dioxide on heating.

It has also been found that the evolution of gas during hot working of dispersion strengthened lead can be substantially eliminated by admixing the substance to be dispersed with the lead particles or coating the substance on the lead particles, whether during the atomizing operation or subsequently thereto, in the substantial absence of carbon dioxide or water or both.

We have now found that the absorption or reaction of carbon dioxide on the surface of the lead particles can be prevented by carrying out the admixture of solid substances with or the coating of solid substances on the lead particles in the presence of acid-forming oxides of sulfur, such as sulfur dioxide and sulfur trioxide, or of the acid derivatives thereof; or subjecting the particles after such admixture or coating, when the surfaces or the particles are substantially free of carbonate ($CO_3$) or other groups which evolve carbon dioxide on heating, to the action of such oxides or acids.

In the production of stabilized non-bubbling lead oxide dispersion strengthened lead by formation of a lead oxide coating on lead particles, the oxidation of the particles either during atomization of the lead or subsequent thereto is carried out in the presence of such oxides or acids, or oxide-coated lead particles the surface of which are substantially free of carbonate ($CO_3$) or other groups which evolve carbon dioxide on heating are subjected to the action of such oxides or acids, thereby stabilizing the non-bubbling character of the dispersion strengthened lead.

The temperature of treatment of the lead particles with the sulfur oxides or acids may be in the range from about 100° C. to about 350° C. or, in case the treatment is carried out by atomizing lead in an atmosphere containing the sulfur oxides or acids, the temperature of treatment may be that of the ambient atmosphere in which the lead is atomized, from as low as 25° C. to above the melting point of lead.

The molar ratio of oxygen to sulfur oxide in the oxidizing atmosphere may be within the range of from about 5 to about 50, preferably between about 10 and about 30.

For example, lead powder having an average particle size of about 10 microns and a surface oxide content of about 2.8% calculated as PbO is heated to a temperature of 300–310° C. for two hours under a vacuum of $10^{-3}$ mm. of Hg. After cooling to 100° C. under vacuum the powder is subjected to the action of dry, carbon dioxide-free air containing sulfur dioxide at a partial pressure of about 20 mm. of Hg at 100° C. for 30 minutes. About 0.08 cc. of gas per gram of powder is absorbed. A sample of the powder shows substantially no evolution of gas when subsequently heated to 335° C. under a vacuum of $10^{-3}$ mm. of Hg. The molar ratio of oxygen in lead oxide to combined sulfur oxide as sulfur dioxide in the coating of the particles is about 18. When the treating atmosphere contains water vapor at a partial pressure of about 4 mm. of Hg for example, the absorption of sulfur dioxide is somewhat higher. In either case, substantially no absorption of carbon dioxide occurs on subsequent treatment of the powder at 100° C. with either dry or moisture-containing air having a carbon dioxide content at a partial pressure of 15 to 20 mm. of Hg, indicating the stability of the sulfur oxide treated powder under normal handling and storage conditions.

When the particles obtained by the foregoing treatment are compacted into a bar under 60,000 p.s.i. in a vacuum and extruded into shaped structures, the extruded structures are readily welded by conventional welding techniques whereas the original particles similarly compacted and extruded form unsatisfactory welded joints because of evolution of gas at the joint.

The products of the invention may be marketed in the form of the sulfur oxide or acid treated particles or in the form of rolled, extruded or otherwise shaped articles. Such articles may be hot-rolled or fusion welded without any indication of bubbling or development of porosity.

We claim:

1. A method of making lead particles for the production of lead products strengthened by the dispersion of solid substances therein and capable of being hot worked without substantial gas evolution which comprised adding an insoluble solid substance to lead particles not exceeding about 150 microns in particle size by admixing the substance with or coating the substance on the particles and subjecting the particles during or after such admixture or coating to the action of an acid forming oxide of sulfur or an acid derivative thereof in the absence of free or combined carbon dioxide.

2. A method of making lead particles for the production of lead products strengthened by the dispersion of lead oxide therein and capable of being hot worked without substantial gas evolution which comprises subjecting lead particles not exceeding about 150 microns in particle size to the action of an acid-forming oxide of sulfur or an acid derivative thereof in the absence of free or combined carbon dioxide during or subsequent to the formation of a coating of lead oxide on the surface of said particles.

3. A method as defined in claim 2 wherein the sulfur oxide or acid is present in an oxygen-containing atmosphere in which the lead particles are formed by atomization.

4. A method as defined in claim 2 wherein the sulfur oxide or acid is present in an oxygen-containing atmosphere in which the lead particles are subjected to oxidation.

5. A method as defined in claim 2 in which the oxide of sulfur is sulfur dioxide.

6. A method as defined in claim 3 in which the molar ratio of oxygen to sulfur oxide in the oxidizing atmosphere is in the range of from about 5 to about 50.

7. A method as defined in claim 2 wherein the average particle size of the lead particles does not exceed about 20 microns.

8. Lead particles not exceeding about 150 microns in particle size coated with lead oxide in an amount of from about 0.5 to about 16% by weight calculated as lead oxide and containing in the surface coating a combined acid oxide of sulfur in the molar ratio of oxygen to sulfur oxide of from about 5 to about 50, and being free of hydroxyl (OH), carbonate ($CO_3$) or other groups capable of evolving water or carbon dioxide on heating.

9. Lead particles as defined in claim 8 wherein the average particle size does not exceed about 20 microns.

10. Lead particles as defined in claim 8 wherein the molar ratio of oxygen to sulfur oxide in the surface coating is about 20.

References Cited

UNITED STATES PATENTS

| | | | |
|---|---|---|---|
| 1,156,079 | 10/1915 | Holley | 264—12 |
| 2,209,964 | 8/1940 | Ferguson | 264—12 |
| 3,189,989 | 6/1965 | Ebdon | 29—420.5 |
| 3,315,342 | 4/1967 | Roberts | 29—420.5 |
| 3,320,664 | 5/1967 | Krantz et al. | 29—420.5 |
| 3,346,677 | 10/1967 | Kinsell | 264—12 |

RALPH S. KENDALL, Primary Examiner

U.S. Cl. X.R.

29—192, 420.5; 117—100; 264—12